United States Patent Office

3,528,755
Patented Sept. 15, 1970

3,528,755
MOTOR COMPRESSOR, PARTICULARLY FOR SMALL REFRIGERATING MACHINES
Knud Vagn Valbjørn and Heinz Mahncke, Nordborg, and Steinar Skog, Sonderborg, Denmark, assignors to Danfoss A/S, Nordborg, Denmark, a corporation of Denmark
Filed July 10, 1968, Ser. No. 743,726
Int. Cl. F04b *35/04, 39/00*
U.S. Cl. 417—312                                     9 Claims

ABSTRACT OF THE DISCLOSURE

The invention relates to a motor-compressor assembly of the type in which a single unitary casing serves as a support for the electric motor, has a piston chamber formed therein and has a main bearing for the crankshaft. The casing has a central cavity in which a cup-shaped member is disposed in surrounding relation to the crank portion of the crankshaft. The cup-shaped member provides an auxiliary bearing for the crankshaft and partial wall means for sound reduction chambers which may be formed in the casing.

---

Figure 1:
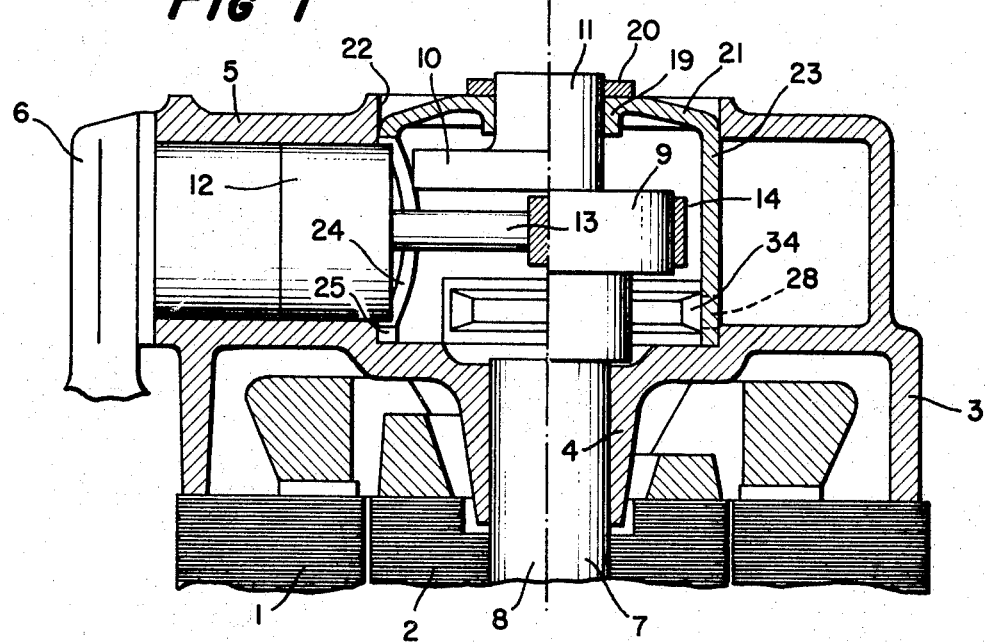

This invention relates to a motor compressor, particularly for small refrigerating machines, comprising a shaft supported in a main bearing and an auxiliary bearing, the main bearing being formed on a motor-supporting element, formed as one piece with the cylinder and, possibly, the sound-reduction chambers, and the auxiliary bearing being formed on an insert connected to the motor-supporting element. With the help of such an insert, a one-piece, but double mounted motor crankshaft can be fitted in a simple manner.

It is known to design the insert in the form of a plate and to screw it on to the end face of the motor supporting element. The screwed connection is time-consuming and expensive, this applying particularly in the case of mass-production. Furthermore, it is difficult or impossible to design such an insert to form other functions.

The object of the invention is to provide a motor compressor the insert of which can be produced and attached in a simpler and cheaper manner and, if required, used for other functions.

According to the invention, this object is achieved by forming the insert as a cup, arranging it to extend axially over at least part of the crank, providing it with an opening in the region of the cylinder and securing it on the supporting element by its outer periphery.

The cup-shaped insert thus is of considerable axial length, which would collide with the movable parts of the compressor if an appropriate orifice were not provided in the wall of the cup. The large axial length enables the insert to be attached exclusively by its periphery, and in particular by being pressed in. Furthermore, the axial length results in good centring and axial alignment of the auxiliary bearing, with the additional advantage that the centring is achieved with the help of the surface over which the attachment is made. It is also simple to manufacture such a cup. Substantially, only the outer peripheral surface and the surface of the auriliary bearing need be machined. Both can be machined in a precisely concentric manner, requiring only to be clamped once.

Similarly, the main bearing and the cylindrical orifice in the supporting element for accommodating the insert can be produced precisely concentrically in one operation. Thus, the auxiliary bearing must lie exactly concentrically relatively to the main bearing. A further advantage of this construction consists in the fact that the insert is itself of rigid and non-resonant form.

The retention of the insert in the supporting element, obtainable in this manner, is so good that it often suffices to secure the insert in the supporting element merely at its base end and at its open end.

Additionally, the insert can be used for forming the sound-reduction chambers; this is done, for example, by arranging for the sound-reducing chambers, fitted in the supporting element, to be open in the direction of the crank and only to be closed by the cup-shaped insert. This results not only in a particularly simple system of closing the sound-reduction chambers, but also leads to the possibility of using a very simple casting for the supporting element, since the cores for the sound-reduction chambers can be readily removed because of the large orifices and the chambers can be easily cleaned. Moreover, only the core is required.

The insert can also be used for forming passages connecting the sound-reduction chambers. This is done, for example, by providing the insert with an arcuate closely-fitting passage portion on its inside and preferably at its open end and by providing apertures at the level of the passage portion.

Another possible way of connecting the sound-reduction chambers, that is particularly advatageous in the case of cups made of cast iron, consists in forming, on that end-face in the motor-supporting element facing the open end of the cup, grooves for connecting the sound-reduction chambers, in machining flat the end-face portion located within the projection area, in covering said portion with a ring and in fitting the cup to the ring. In particular, the ring can be held against the end-face by the cup. It can also take the form of a flange on the open base of the cup and can contain a recess for the piston.

Figure 2:
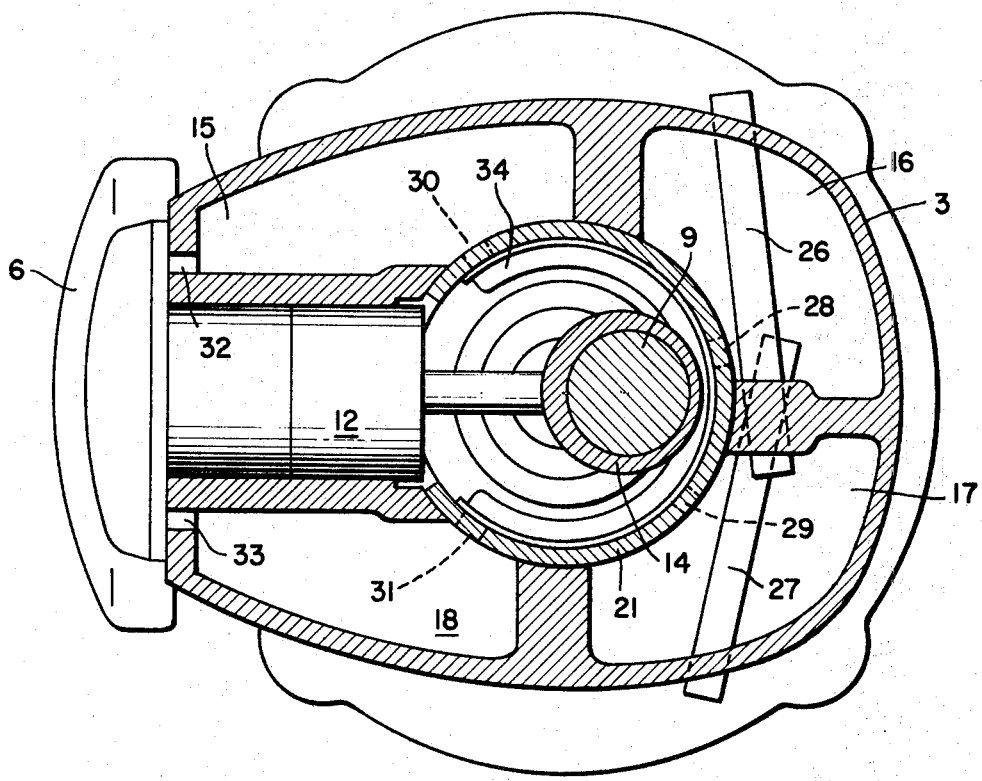
Figure 3:
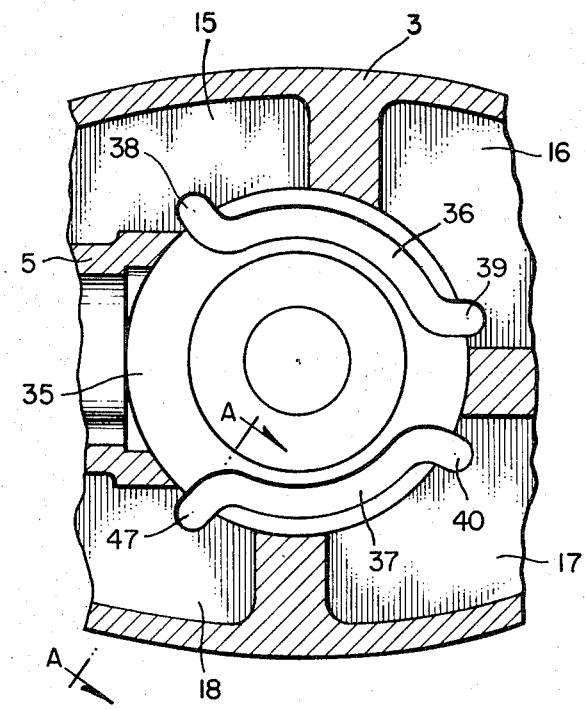
Figure 4:
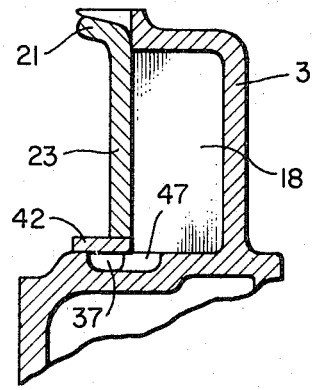

The invention will now be explained in more detail, by reference to two embodiments illustrated in the drawing, wherein:

FIG. 1 is a partial longitudinal section through a first embodiment of the invention, FIG. 2 shows a horizontal section at the level of the central axis of the cylinder, through the embodiment shown in FIG. 1, FIG. 3 shows a horizontal partial section through a supporting element of a second embodiment at the level of the central axis of the cylinder, and FIG. 4 is a vertical partial section on the line A—A of FIG. 3, after the cup-shaped insert has been fitted.

In the embodiment shown in FIGS. 1 and 2, the motor compressor comprises, in the usual way, a stator 1, a rotor 2, a supporting element 3, incorporating a main bearing 4 and the cylinder 5, and cylinder head 6, a motor crankshaft 7 comprising a main bearing portion 8, a crank 9, a balance weight 10 and an auxiliary bearing portion 11, and a piston 12 incorporating a connecting rod 13 and crank bearing 14. Four sound-reduction chambers 15–18 are provided in the supporting element. The auxiliary bearing portion 11 is mounted in an auxiliary bearing 19 and is held against movement in the axial direction by a bearing ring 20.

The auxiliary bearing 19 is formed on a cup-shaped attachment 21 which is pressed into a cylindrical recess 22 in the supporting element. The cup-shaped insert 21 thereby bears against the supporting element 3 by its peripheral wall 23 near its base, near its open end and in the region of the transverse walls defining the sound-reduction chambers 15–18. This results in a firm seating and in good centring. Additionally, the sound-reduction chambers 15–18, which are open in the direction of the crank 9, are sealed off. In the region of the cylinder, the cup-shaped insert 21 contains a cylindrical orifice 24, through which the piston can move, and, adjoining the orifice at the bottom thereof, a slot 25 which, for the purpose of assembly, enables the insert 21 to be pushed over the connecting rod 13.

The sound-reduction chambers 15–18 form a suction sound-reduction system. The gas is sucked through two pipes 26 and 27 into the chambers 16 and 17 and is thence passed through orifices 28–30 in the peripheral wall 23 into the chambers 15–18, from which they flow through passages 32 and 33 into the suction-valve chamber of the cylinder head 6. The connection between the orifices 28–31 is established by way of an arcuate passage portion 34 which is soldered on to the inside of the peripheral wall 23 at the level of the orifices.

For the purpose of assembly, the piston 12 is pushed into the cylinder 5. The shaft 7 is then pushed from above through the crank bearing 14 into the main bearing 4, whereby, during the last part of the movement, the crank bearing 14 is moved on to the crank 9 by the main bearing portion 8, using the adjoining intermediate portion of the shaft. Then, the cup-shaped insert 21, to which the passage portion 34 has already been attached, is pressed in from above, whereby the projecting shaft portions 10 and 9 can, if necessary, be rotated so that they are located in the part not containing the passage portion 34. It is now only necessary to fit the ring 20 and the rotor 2 from the other side, in order to hold the shaft 7 against axial movement.

In the embodiment shown in FIGS. 3 and 4, like reference numerals are used for like parts. Here, too, the insert 21 serves to close the sound-reduction chambers. The connection between the various sound-reduction chambers is established in a different manner, however. In the supporting element 3, grooves 36 and 37 are provided in the face 35 of the floor of the recess 32 when the element is cast, and the ends 38–41 of these grooves each extend into the chambers 15–18. After the face of the floor of the recess has been machined flat, a ring 42 is fitted on these grooves which ring is retained by the peripheral wall 23 of the insert 21. Further attachment means is unnecessary in normal cases, since the seal achieved is quite sufficient for the desired purpose.

The insert 21 can be a drawn or cast part. The annular plate 20 can be pressed or welded on to the shaft 7, though it can also be simply fixed at its upper side by means of a circlip engaging in a groove in the shaft 7.

What is claimed is:

1. A compressor comprising a one-piece casing member having a main bearing, said casing member defining a piston chamber and portions of sound reduction chambers above and in surrounding relation to said main bearing, said casing member having wall portions defining a skelton outline of a central cavity in said housing, a cup-shaped member invertedly and fixedly disposed in said cavity and forming interior wall portions for said sound reduction chambers, a crankshaft journalled in said main bearing and having a crank portion in alignment with said piston chamber and surrounding by said cup member, a piston in said piston chamber, a connecting rod connecting said piston and said shaft crank portion, said cup member having an auxiliary bearing in vertical alignment with said main bearing for journalling the upper portion of said crankshaft and a lateral opening through which said connecting rod extends.

2. A compressor according to claim 1 wherein said cup member is in press fitting relation to said wall portions.

3. A compressor according to claim 1 wherein said sound reduction chambers are formed partially by said casing wall portions and partially by said cup member.

4. A compressor according to claim 3 wherein said cup member has apertures opening into each of said sound reduction chambers, and passage means internally of said cup member connecting said suond reduction chambers through said apertures.

5. A compressor according to claim 1 wherein a floor for said cavity is formed by said casing.

6. A compressor comprising a casing having a main bearing, said casing defining a piston chamber and portions of sound reduction chambers above and in surrounding relation to said main bearing, said casing having wall portions defining portions of a central cavity in said housing, a cup-shaped member invertedly and fixedly disposed in said cavity, a crankshaft journalled in said main bearing and having a crank portion in alignment with said piston chamber, a piston in said piston chamber, a connecting rod connecting said piston and said shaft crank portion, said cup member having an auxiliary bearing in vertical alignment with said main bearing for journalling the upper portion of said crankshaft and a lateral opening surrounding said connecting rod, and grooves having communication with said sound reduction chambers formed in said cavity floor for providing fluid communication between said sound reduction chambers.

7. A compressor according to claim 6 wherein a frusto-ring shaped member is disposed on said floor and covers at least a portion of said grooves.

8. A compressor according to claim 7 wherein said frusto-ring member is held in place of said cup member.

9. A compressor according to claim 7 wherein said frusto-ring shaped member is positioned with its open end adjacent said piston chamber to provide clearance for the stroke of said piston.

References Cited

UNITED STATES PATENTS 2,019,689  11/1935  Marbury _____ 230—58
2,956,730  10/1960  Hamilton et al. _____ 230—58

ROBERT M. WALKER, Primary Examiner

U.S. Cl. X.R.

417—415